United States Patent [19]

Russin

[11] Patent Number: 4,679,490
[45] Date of Patent: Jul. 14, 1987

[54] OSCILLATOR RECIPROCATION CONTROL SYSTEM FOR PISTON MOTOR

[76] Inventor: Leonid P. Russin, ulitsa Nelidovskaya, 22, kv. 18, Moscow, U.S.S.R.

[21] Appl. No.: 649,668

[22] Filed: Sep. 12, 1984

Related U.S. Application Data

[60] Division of Ser. No. 318,569, Nov. 5, 1981, Pat. No. 4,487,107, which is a continuation of Ser. No. 45,674, Jun. 5, 1979, abandoned.

[51] Int. Cl.[4] .................. F01L 15/00; F01L 33/00; F15B 13/16
[52] U.S. Cl. .................................. 91/189 R; 91/361
[58] Field of Search ............... 91/188, 39, 189 R, 191, 91/194, 361, 459, 275; 330/1 A; 318/677, 681, 608

[56] References Cited

U.S. PATENT DOCUMENTS

| 466,454 | 1/1892 | Byers | 91/188 |
|---|---|---|---|
| 2,604,079 | 7/1952 | Ray | 91/275 X |
| 2,955,460 | 10/1960 | Stevens et al. | 91/275 X |
| 2,987,050 | 6/1961 | Oppenheimer et al. | 91/459 |
| 3,488,999 | 1/1970 | Catania | 91/275 X |
| 3,815,473 | 6/1974 | Jones, Jr. | 91/275 X |

FOREIGN PATENT DOCUMENTS 657840 2/1963 Canada .................... 91/188

Primary Examiner—Robert E. Garrett
Assistant Examiner—George Kapsalas
Attorney, Agent, or Firm—Holman & Stern

[57] ABSTRACT

An external combustion engine comprises an actuating cylinder in which a piston with rod is mounted for reciprocation, said piston serving as the actuating member, a valve distributor serving as the switching member, as well as a crank gear serving as the converter of the piston reciprocation to the drive shaft revolution. The piston divides the cylinder cavity into two, namely, a rod cavity and a rodless cavity. Each one of the cavities communicates with a source of working fluid via valve distributor. The piston rod is operatively connected with the drive shaft via crank gear. The engine further comprises an electric oscillator whose frequency is variable in accordance with the preset r.p.m. of the drive shaft, connected electrically with the converter in the form of a linear dynamic link, and a transducer indicating the current value of the piston position relative to its neutral position. The linear dynamic link is coupled mechanically with the distributor slide valve. The transducer of the current value of the piston position is coupled by means of negative electric feedback to the converter, and mechanically—to the piston rod.

4 Claims, 6 Drawing Figures

OSCILLATOR RECIPROCATION CONTROL SYSTEM FOR PISTON MOTOR

This is a divisional of application Ser. No. 318,569 filed Nov. 5, 1981, now U.S. Pat. No. 4,487,107, which in turn is a continuation of application Ser. No. 045,674, filed June 5, 1979, now abandoned.

BACKGROUND OF THE INVENTION

1. Field of the Invention

The present invention relates to the field of engine making and, more particularly, it relates to a method of controlling the revolution of the drive shaft of an external combustion engine and to Russin external combustion engine.

This invention can be used most advantageously in reciprocatiing heat engines.

2. Description of the Prior Art

In view of the energy crisis affecting many countries and a catastrophic pollution of the atmosphere of large cities with exhaust gases of the existing internal combustion engines, one of the most urgent problems of today appears to be that of developing an engine having on its drive shaft a constant maximum torque independent of the engine r.p.m., featuring a stability and uniformity of the drive shaft revolution over a wide range of from zero to the maximum value on the order of 5,000 r.p.m. without using a flywheel and r.p.m. governor, fired with practically any readily available fuel and polluting the atmosphere with waste gases but slightly, featuring a high power at small weight and overall dimensions, exhibiting a high efficiency, reliability, response and operating economy, as well as characterized by simplicity of control (requiring no gear boxes and clutch gears) when mounted on a transport vehicle.

A serious drawback of internal combustion engines is the non-uniformity of the drive shaft revolution, due to the principle of their operation. In order to reduce the non-uniformity of the drive shaft revolution, use is made of a rather massive flywheel (15-20% of the engine weight), which results in lower engine response and efficiency, as well as in greater weight and overall dimensions of the engine.

Another disadvantage of said engines resides in a strong dependence of the drive shaft torque upon its r.p.m. The higher the torque, the greater the drive shaft r.p.m. value, and vice versa. Therefore, when using such an engine in a transport vehicle, in case low r.p.m. and high torque are required on the drive shaft upon smooth starting, a gear box and clutch gear should be used. A clutch gear is further required because it is impossible to start an internal combustion engine under load.

It should also be noted that high-power internal combustion engines need a special r.p.m. governor, for the engine may start racing. However, such governor varies the drive shaft r.p.m. value by affecting the fuel consumption, i.e., it reduces the fuel flow rate to reduce the drive shaft r.p.m., which results in a lower torque.

Therefore, internal combustion engines fail to ensure stability and uniformity of revolution of the drive shaft, as well as a constant drive shaft torque, over a wide range of r.p.m. values from 0 to $\eta_{max}$.

There are also known in the art external combustion engines, for example, reciprocating heat engines which, as compared to internal combustion engines, feature a somewhat more uniform revolution of the drive shaft, higher efficiency, require no expensive fuel and discharge less atmosphere-polluting waste gases.

However, they also suffer from a number of disadvantages, of which the major ones include the non-uniformity and instability of the drive shaft revolution, due to a strong dependence of the speed of the drive shaft rotation upon the pressure of working fluid and load; a low drive shaft torque at low r.p.m.; a limited range of r.p.m. values; the need to use a flywheel and r.p.m. governor; low response; impossibility of rapid reversing and emergency stopping.

The non-uniformity and instability of the drive shaft rotation are due to the fact that prior art reciprocating heat engines have a direct positive mechanical feedback with respect to the piston position. This positive feedback causes the engine to race upon an increase in the pressure of the working fluid supplied to the valve distributor from a source and the non-uniformity of the drive shaft rotation at low r.p.m.

The afore-described disadvantages of prior art reciprocating heat engines resulted in their restricted use in transport vehicles.

There are further known in the art d.c. electric motors which have a higher uniformity of the drive shaft rotation as compared with external combustion engines. However, these latter motors suffer from a series of drawbacks restricting their use in transport vehicles. The first one of said drawbacks consists in the instability of the drive shaft torque over a wide range of r.p.m. values, due to the fact that the drive shaft r.p.m. and torque are directly proportional to the current in the armature winding of an electric motor. As a result, the torque developed on the engine shaft upon low r.p.m. when starting a transport vehicle has the minimum value whereas the desired drive shaft torque for smooth starting of a vehicle should be the maximum one. The second drawback resides in the instability of r.p.m. values of the electric motor drive shaft under conditions of direct current upon the variation of load applied to the drive shaft. The third one of said drawbacks consists in that it is impossible to stop such electric motors in a preset position of the drive shaft and reverse them instantaneously.

There is known a method of controlling the drive shaft rotation of an external combustion reciprocating engine, as well as an external combustion reciprocating engine such as steam engine (cf., N. V. Inozemtsev, Kurs teplovykh dvigatelei-A Course of Heat Engines, Oboronghiz Publishers, Moscow, 1954, p. 314, FIG. 343).

The prior art controlling method consists in the following.

First, a control signal is shaped for a switching member and converted to mechanical motion of an actuating member. Then, said mechanical movement of the actuating member is converted via converter to revolution of the engine drive shaft. After that, there is shaped a mechanical signal proportional to the sine (cosine) of the drive shaft angle of turn, by means of a second converter of the shaft revolution to the reciprocation of a positive mechanical feedback link which shapes the control signal for said switching member.

The control signal value is, in the general case, a variable sign and the shape of said signal at various loads, working fluid pressures etc. can be arbitrary, viz.: trapezoidal, triangular, truncated sine curve, parabolic, hyperbolic, etc. The control signal frequency is equal to the actual drive shaft r.p.m. value and varies with the load on the drive shaft and the working fluid pressure.

A reciprocating steam engine designed to accomplish said prior art method comprises an actuating cylinder in which a piston is mounted for reciprocation, said piston serving as the actuating member. The piston rod is coupled with a crank gear of the engine drive shaft, which serves as the converter of the actuating member reciprocation to the engine drive shaft revolution. The piston divides the cylinder into two cavities namely, a rodless cavity and a rod cavity. Each one of said cavities communicates with the steam source via valve distributor serving as the switching member. The engine drive shaft is rigidly coupled with a second crank gear serving as the converter of the drive shaft revolution to the reciprocation of a bar serving as positive mechanical feedback and articulated with its one end to the second crank gear and with its other end—to the distributor valve.

Inasmuch as the drive shaft revolution depends upon the presence of positive mechanical feedback between the drive shaft and valve, such revolution is, in principle, an unstable one, which results in the engine racing under conditions of high working fluid pressure and in the nonuniformity of rotation under conditions of low working fluid pressure. This calls for the provision of an r.p.m. governor and rather bulky flywheels, which limits the range of the drive shaft r.p.m. values and affects the engine response.

As a result of a high non-uniformity of the drive shaft rotation, said prior art method fails to ensure a constant drive shaft torque, this bringing about the emergence of inertia loads on the drive shaft which, in turn, calls for greater weight and larger overall dimensions of the engine because of strength requirements.

According to such method, the r.p.m. values of the engine drive shaft are adjusted by varying the working fluid pressure. This results in a lower torque at low r.p.m., which calls for the use of gear boxes and clutch gears when mounting such an engine on a transport vehicle, which brings about a heavier weight, more complicated structure, high mechanical losses and a lower efficiency.

In addition, since the prior art engine has positive mechanical feedback, it is incapable of varying the working fluid flow rate with load, which affects the operating economy of the engine. For the same reason, the engine cannot be momentarily stopped or reversed.

Due to the presence of the positive mechanical feedback link, the prior art method fails to ensure the stability and uniformity of the engine drive shaft rotation over a wide range of r.p.m. values at a constant shaft torque, as well as a single-valuedness of the actual r.p.m. value of the drive shaft and a preset r.p.m. value upon variation of the load applied to the shaft and the working fluid pressure.

BRIEF SUMMARY OF THE INVENTION

It is an object of the present invention to provide a method of controlling the revolution of the drive shaft of an external combustion engine, that would ensure a stable rotation of the drive shaft over a wide range of its r.p.m. values and loads under conditions of single-valuedness of the actual r.p.m. value upon revolution of the engine drive shaft and preset r.p.m. value, namely, a preset value of the control signal frequency, as well as a considerable increase of the engine response.

It is another object of the present invention to provide a method ensuring a uniform rotation of the drive shaft over a wide range of r.p.m. values and loads.

It is still another object of this invention to provide for a practically instantaneous variation of direction of the engine drive shaft rotation.

It is yet another object of the present invention to provide a method of controlling the revolution of the drive shaft of an engine that would ensure a practically absolute uniformity and stability of the shaft rotation over a wide range of r.p.m. values from 0 to $\eta_{max}$ at a constant maximum drive shaft torque.

It is still further object of the present invention to ensure a practically instantaneous discontinuation of the drive shaft rotation in a preset position of the actuating member.

Further, it is an object of this invention to provide a substantially ecologically clean external combustion engine having a higher efficiency owing to reduced mechanical losses and to the provision of negative feedback with respect to the position of the engine actuating member, and a higher maximum power owing to reduced weight and overall dimensions.

It is one more object of this invention to provide an external combustion engine of simple design, featuring a higher operating economy, reliability and a longer service life.

It is a further object of the present invention to ensure by simple means a rapid start-up and shutdown of the external combustion engine, as well as a practically instantaneous variation of the direction of its drive shaft rotation.

It is yet further object of this invention to ensure the maximum value of the engine drive shaft torque at any r.p.m. values, sufficient to set to rotation the drive wheels of a transport vehicle in the absence in the latter of a gear box and clutch gear.

It is also an object of the present invention to provide an external combustion engine featuring a constant drive shaft torque over the entire range of r.p.m. values from 0 to $\eta_{max}$ at a preset load.

It is finally an object of the present invention to provide an external combustion engine capable of being started-up under load.

In accordance with the above and other objects, the present invention resides in that, according to the herein disclosed method of controlling the revolution of the drive shaft of an external combustion engine, a control signal for a switching member is shaped in the form of symmetric, periodic sustained vibrations of variable sign, the time intervals of positive and negative values of said vibrations being of equal duration, and the frequency of said vibrations is set equal to a preset number of the drive shaft revolutions; said control signal is converted to mechanical movement of an actuating member, the variation of said movement corresponding in time to the control signal variation; then, an instantaneous value of the control signal is varied in proportion to the variation of load on the drive shaft; further, the actuating member movement is converted by a converter to revolution of the engine drive shaft.

Such a method ensures a stable rotation of the drive shaft over a wide range of r.p.m. values and leads applied to the drive shaft under conditions of single-valuedness of the actual r.p.m. value upon drive shaft revolution and preset value of the vibrational control signal frequency.

A stable rotation of the drive shaft upon varying the load from zero to the maximum value serves to preclude both the racing and stopping of the engine, i.e., expands the range of maximum-to-minium r.p.m. values of its drive shaft.

It is expedient that the shaped control signal be a sinuosidal signal whose current value at the starting moment of the drive shaft revolution is equal to zero and grows subsequently to the maximum value equal to the amplitude of said control signal.

The method according to the invention ensures a uniform rotation of the drive shaft over a wide range of its r.p.m. values from 0 to $\eta_{max}$ and loads from zero to the maximum one. In addition, the utilization of the disclosed method in an engine results in higher power of the engine owing to increased maximum torques, higher efficiency owing to reduced mechanical losses, and higher operating economy owing to a movement of the switching member in proportion to the load.

With such a method of controlling the revolution of the drive shaft, the r.p.m. value of the drive shaft and the working fluid pressure causing the actuating member to move are rendered independent of each other, which makes for higher power without the hazard of engine racing.

The reduction of mechanical losses is attained owing to a decrease of inertia forces affecting the drive shaft, reduction of friction forces due to smaller dimensions of the drive shaft, elimination of special r.p.m. governors, reduction of the flywheel size and attenuation of torsional vibrations.

The polarity of the shaped control signal can be varied.

Such a method of control ensures a practically instantaneous variation of the direction of engine drive rotation, which improves considerably the ability of a transport vehicle utilizing the engine in question to vary the direction of movement, i.e., improves the vehicle maneuverability.

Meanwhile, in the prior art engines such as reciprocating heat engines the variation of the direction of drive shaft rotation can only be effected by lowering the drive shaft torque down to zero, i.e., stopping the engine, followed with the disconnection of the engine drive shaft from the vehicle shaft, after which the switching member position is changed mechanically and the engine drive shaft is re-connected with the vehicle shaft. Following all these steps, the engine is started again.

As a result, much longer time is required to effect the variation of the direction of drive shaft rotation in prior art engines, their operation is more complicated and reliability much lower.

It is recommended that another vibrational control signal be shaped for a second switching member, said signal being shifted with respect to the preceding one through a constant circuit angle essentially equal to the angle of turn of a second converter relative to the first converter.

Said step helps attain a practically absolute uniformity and stability of the drive shaft rotation over a wide range of r.p.m. values from 0 to $\eta_{max}$ at a constant drive shaft torque.

With such a way of shaping vibrational control signals, when one of said signals is shifted with respect to the subsequent one through a constant circuit angle equal to the angle of turn of the first converter relative to the second converter, say, 90°, the force acting upon the first converter is proportional to Sin/Cos of the drive shaft angle of turn while the force acting upon the second converter is proportional to Cos/Sin of the shaft angle of turn. Then, the drive shaft torque due to said forces will be equal to the sum of two components of which one is proportional to $\sin^2 \psi$ ($\cos^2 \psi$) and the other—to $\cos^2 \psi (\sin^2 \psi)$, where $\psi$ is the angle of turn of the drive shaft, known to be a constant value $\sin^2 \psi + \cos^2 \psi = 1$ independent of the drive shaft angle of turn and, consequently, of the drive shaft r.p.m.

The engines utilizing said step need no flywheel, which helps to considerably increase the engine response, reduce the weight and overall dimensions, and simplify the design.

It is desirable that the control signal value corresponding to a preset position of the actuating member be shaped constant, equal to the instantaneous value of the vibrational control signal at the moment the shaft ceases its revolution.

Said latter step makes for a practically instantaneous discontinuation of the drive shaft rotation in a preset position of the actuating member, thereby precluding jerks and knocks of the drive shaft when ceasing the revolution. The latter results in a considerable improvement of the reliability and longer service life of the engine.

The present invention further resides in that the herein disclosed external combustion engine comprises an actuating cylinder in which a piston with rod is mounted for reciprocation, said piston serving as the actuating member and dividing the cylinder cavity into two parts, namely, a rodless cavity and a rod cavity, each one of said cavities communicating with a source of working fluid via valve distributor serving as the switching member, while the piston rod is operatively coupled with the drive shaft via a crank gear serving as the converter of the piston reciprocation to the drive shaft revolution; an electric oscillator whose frequency is variable in accordance with a preset r.p.m. of the drive shaft, said oscillator connected electrically with a converter in the form of a linear dynamic link coupled mechanically with the distributor valves; as well as a transducer indicating the current value of the piston position relative to its neutral position, said transducer coupled by means of negative electric feedback to the converter and mechanically—to the piston rod.

Such a structural embodiment of the external combustion engine of the invention results in a higher efficiency, maximum power at reduced weight and overall dimensions, simpler design, greater operating economy and reliability and longer service life, as well as renders the engine capable of being started under load. The use of a variable-frequency electric oscillator in combination with a converter fashioned as a linear dynamic link provides for a stable rotation of the drive shaft over a wide range of r.p.m. values from zero to $\eta_{max}$ and for single-valuedness of the actual r.p.m. value of the drive shaft revolution and the preset value of the electric oscillator frequency.

The provision of a transducer indicating the current value of the piston position relative to its neutral position, coupled electrically to a converter and mechanically—to the piston rod of the actuating cylinder, is essential for setting up negative electric feedback owing to which a stable rotation of the engine drive shaft is effected upon variation of load from zero to the maximum value and working fluid pressure.

In addition, the provision of negative electric feedback results in greater operating economy of the engine due to an automatic variation of the working fluid flow rate with the variation of load on the drive shaft.

It is expedient that the negative electric feedback be formed by a first operational amplifier whose non-inverting input is connected to the oscillator and its inverting input is connected to the transducer indicating the current value of the piston position relative to its neutral position, while the operational amplifier output is connected to the converter.

The use of an operational amplifier is required for structurally embodying, by simple means, negative electric feedback and for amplifying the electric oscillations of the oscillator and the transducer of the current value of the piston position.

It is recommended that the engine incorporate a switch connected in the electric circuit formed by the oscillator and operational amplifier, said switch acting in one of its positions to break said oscillator-operational amplifier circuit, in a second position—to directly connect said oscillator and amplifier, and, in a third position, said switch being connected with an output of a second operational amplifier whose inverting input is connected to the oscillator.

The incorporation of a switch provides simple means for a rapid start-up of the engine and for a practically instantaneous variation of the direction of the drive shaft rotation, as well as for the shutdown of the engine only upon the neutral position of the piston.

It is essential that the herein disclosed external combustion engine be provided with a device for discontinuing the revolution of the drive shaft in a preset piston position, said device shaping a constant signal equal to the instantaneous value of the control signal at the moment the revolution is discontinued, an output of said device being connected via switch to its input by means of a positive inertia feedback circuit, and to the non-inverting input of the first operational amplifier, the oscillator-first operational amplifier circuit being broken.

This latter device provides for a practically instantaneous discontinuation of the drive shaft rotation in a preset position of the piston, thereby precluding jerks and knocks of the drive shaft when ceasing its revolution.

It is expedient that the herein disclosed reciprocating external combustion engine comprise another, second actuating cylinder in which a piston with rod is mounted for reciprocation and divides the cylinder cavity into two parts, namely, a rodless cavity and a rod cavity, each one of said cavities communicating with the source of working fluid via second valve distributor, while the piston rod is operatively coupled with the drive shaft via second crank gear, the initial position of the piston of the second actuating cylinder being shifted relative to the position of the piston of the first actuating cylinder through a constant value corresponding to the circuit angle of turn of the second crank gear with respect to the first crank gear, said engine further comprising a second converter of an electric signal to mechanical movement of a valve of the second distributor, fashioned as a linear dynamic link coupled mechanically with the valve of the second distributor and electrically—with a unit of constant phase shift between the signal supplied from the first operational amplifier and signal at the output of said unit connected to the first operational amplifier.

Such a structural embodiment of the engine ensures a constant drive shaft torque over the entire range of r.p.m. values from 0 to $\eta_{max}$ at a preset load, as well as a practically absolute uniformity and stability of the drive shaft rotation in said range of r.p.m. values.

The engine according to the present invention is simple of design, has a low weight and small overall dimensions, and features high operating economy and reliability thanks to the elimination of flywheel, special r.p.m. governor, clutch gear and gear box.

It is possible that the reciprocating engine of the invention comprise another, second actuating cylinder in which a piston with rod is mounted for reciprocation and divides the cylinder cavity into two parts, namely, a rodless cavity and a rod cavity, each one of said cavities communicating with the working fluid source via second valve distributor, while the piston rod is operatively coupled with the drive shaft via second crank gear, the initial position of the piston of the second actuating cylinder being shifted relative to the position of the piston of the first actuating cylinder through a constant value corresponding to the circuit angle of turn of the second crank gear with respect to the first crank gear, said engine further comprising a second converter of an electric signal to mechanical movement of a valve of the second distributor, fashioned as a linear dynamic link coupled mechanically with the valve of the second distributor and electrically—with an output of a third operational amplifier whose non-inverting input is connected via switch to the output of a constant phase shift unit whose input is electrically connected to the oscillator while an inverting input of the third operational amplifier is coupled by means of negative electric feedback to a transducer indicating the current value of the position of the piston of the second actuating cylinder relative to its neutral position, said transducer being mechanically coupled with the rod of the piston of the second actuating cylinder.

The latter engine embodiment has all of the advantages listed above, however, it is characterized by a simpler electronic circuit for controlling the distributor valve and, therefore, the instrument drift of the operational amplifiers has a smaller effect upon the speed of the drive shaft rotation.

It is recommended that the herein disclosed reciprocating external combustion engine be provided with a second device for discontinuing the revolution of the drive shaft in a preset position of the piston of the second actuating cylinder, said device shaping a constant signal equal to the instantaneous value of the control signal at the moment the revolution is discontinued, said device output being connected by a switch to its input by means of a positive inertia feedback circuit, and to the non-inverting input of the third operational amplifier, the oscillator-third operational amplifier circuit being broken.

Said device also provides for a practically instantaneous discontinuation of the drive shaft rotation in a preset position of the pistons, thereby precluding jerks and knocks of the drive shaft in a multicylinder engine when ceasing its revolution.

When using a single device for discontinuing the drive shaft revolution, all of the engine moving parts will be in a state of stress, which keeps the shaft from ceasing its revolution and presents a threat of the engine failure.

BRIEF DESCRIPTION OF THE SEVERAL VIEWS OF THE DRAWINGS

Other objects and advantages of the present invention will be more apparent upon considering the following detailed description of exemplary embodiments thereof, reference being had to the accompanying drawings in which.

DETAILED DESCRIPTION

Figure 1:
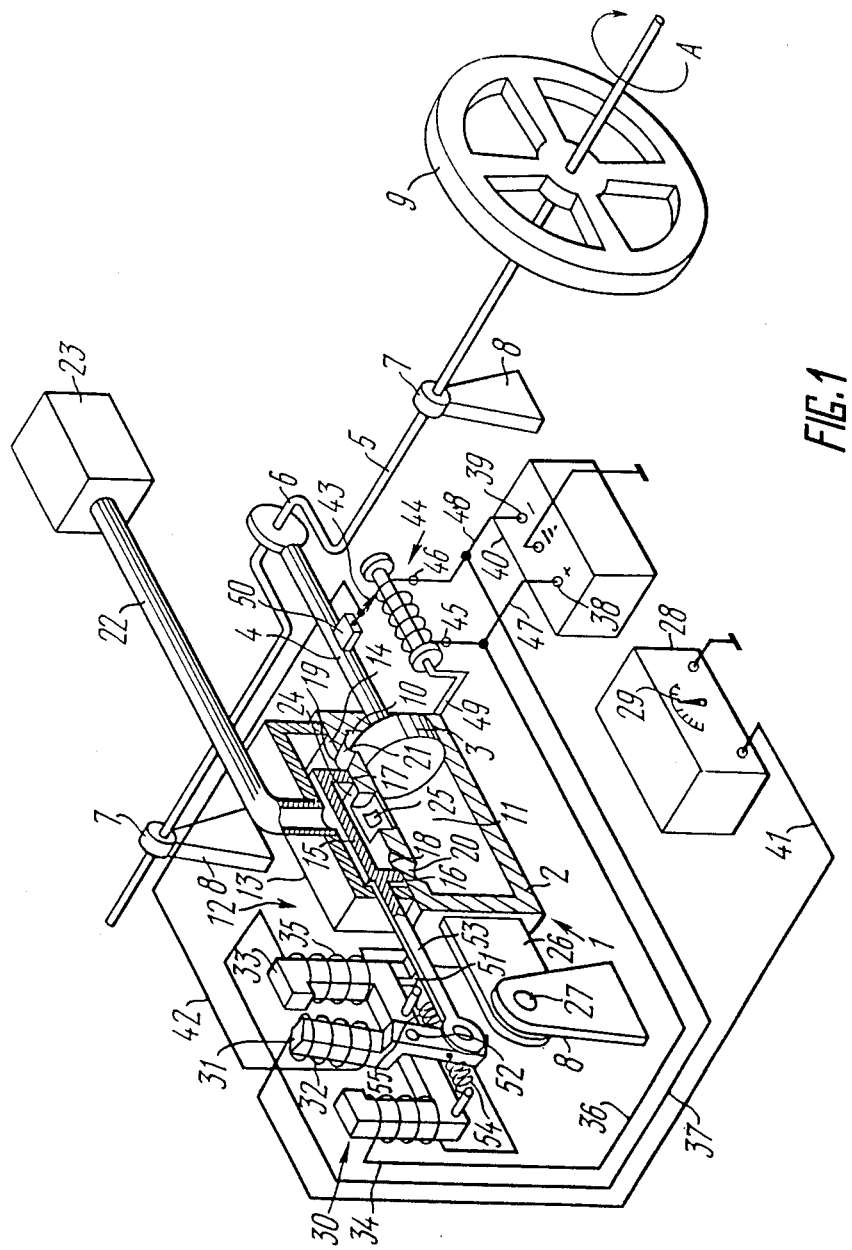
FIG. 1 is a schematic perspective view of the Russin external combustion engine according to the invention.

The herein disclosed method of controlling the revolution of the drive shaft of a reciprocating external combustion engine such as reciprocating steam engine consists in the following.

First, a control signal for a switching member is shaped in the form of symmetric, periodic sustained vibrations of variable sign, the time intervals of positive and negative values of said vibrations being of equal duration, such as sine (cosine) vibrations, and the frequency of said vibrations is set equal to a preset number of drive shaft revolutions. Then, said vibrational control signal is converted to mechanical movement of an actuating member.

The variation of the actuating member movement corresponds in time to the variation of the vibrational control signal. While so doing, an instantaneous value of the control signal is varied in proportion to the variation of load on the drive shaft.

After that, mechanical movement of the actuating member is converted via converter to revolution of the drive shaft with a preset r.p.m. value corresponding to the frequency of the vibrational control signal.

The current value of the sine vibrational control signal at the starting moment of revolution of the engine drive shaft is equal to zero and grows subsequently to the maximum (minimum) value equal to the amplitude of said vibrational control signal.

Such a method of controlling the revolution of the engine drive shaft provides for a stable rotation of the drive shaft over a wide range of r.p.m. values and loads applied to the drive shaft, under conditions of single-valuedness of the actual r.p.m. value upon the drive shaft revolution and a preset value of the vibrational control signal frequency.

In so doing, since the drive shaft r.p.m. value only depends on the vibrational control signal frequency and not on the value of load on the drive shaft, such a method rules out the possibility of both the engine racing and stopping, this expanding the minimum-to-maximum r.p.m. range and making for realization of maximum power.

For maneuvering a transport vehicle, when the direction of movement is to be changed to the opposite one during the minimum period of time, the polarity of the shaped vibrational control signal is varied, while, for emergency stopping in a preset position of the actuating member, the vibrational control signal value corresponding to the preset position of the actuating member is shaped constant, equal to the instantaneous value of the vibrational control signal and of the like sign at the moment the drive shaft ceases its revolution.

This ensures a practically instantaneous variation of the direction of the engine drive shaft rotation and, consequently, of the direction of the vehicle movement. In addition, this results in a practically instantaneous discontinuation of the drive shaft rotation in a present position of the actuating member, which eliminates jerks and knocks of the drive shaft upon an emergency stopping of the latter.

For ensuring a uniform rotation over a wide range of r.p.m. values, there is shaped a second (subsequent) vibrational control signal for a second switching member, said signal being shifted with respect to the first (preceding) one through a constant circuit angle, say, 90°, essentially equal to the turn of a second converter relative to the first converter.

This makes for a practically absolute uniformity of rotation over a wide range of r.p.m. values from 0 to $\eta_{max}$ and loads from zero to maximum one at a constant drive shaft torque in said r.p.m. range, without the need to use flywheels and special r.p.m. governors in the engine realizing the method of the invention.

The herein disclosed pneumatic or hydraulic engine for a transport vehicle comprises an actuating cylinder 1 (FIG. 1) in whose body 2 a piston 3 is mounted for reciprocation. The piston 3 has a rod 4 whose one end is rigidly attached to the piston 3 and the other end is articulated to a mechanism designed to convert the reciprocation of the piston 3 to revolution of a drive shaft 5 and fashioned as, say, a crank 6. This latter crank is rigidly coupled with the engine drive shaft 5 mounted in sliding bearings 7 located in the engine casing 8. A flywheel 9 is mounted on the drive shaft 5. The piston 3 divides the cylinder 1 into two cavities, namely, a rod cavity 10 and a rodless cavity 11.

Mounted on the body 2 of the cylinder 1 is a box-type valve distributor 12 fashioned as a flat box 13 attached to a thoroughly machined surface 14 of the body 2 of the cylinder 1, referred to as a "slide valve face", on which a valve 15 reciprocates. Upon movement of the valve 15, its walls 16, 17 open ports 18, 19 communicating each, via respective channels 20, 21, with the cavities 11 and 10 of the cylinder 1, respectively.

The thickness of the walls 16, 17 of the valve 15 is equal to the width of the ports 18, 19.

The valve box 13 is connected via pipeline 22 with a source 23 of working fluid while a space 24 defined by the inner surface of the valve 15 and surface 14 of the body 2 of the cylinder 1 communicates with an exhaust port 25 through which spent working fluid is discharged.

The body 2 of the cylinder 1 has an extension 26 with a hole at the outer in which an axle 27 is located. Said axle 27 serves to connect the cylinder 1 with the engine casing 8.

The pneumatic or hydraulic steam engine of the invention is provided with an electric oscillator 28 whose frequency is variable in accordance with the the preset r.p.m. of the drive shaft 5. The frequency of the oscillator 28 is adjusted by means of a lever 29. Said electric oscillator 28 is coupled electrically with a converter 30 designed to convert an electric signal to mechanical movement of the valve 15. The converter 30 is fashioned as a linear dynamic link and presents, for example, an electromagnet the movement of whose armature 31 is proportional to the current in its winding 32.

The electromagnet includes a horseshoe stator 33 with windings 34 and 35 respectively connected by electric circuits 36 and 37 to a positive electrode 38 and negative electrode 39 of a d.c. source 40 and inducing unidirectional magnetic fluxes.

The front end of the winding 32 of the electromagnet armature 31 is connected via electric circuit 41 to the input of the variable-frequency electric oscillator 28. The tail end of the winding 32 of the electromagnet armature 31 is connected via electric circuit 42 to a movable contact 43 of a variable resistor 44.

The variable resistor 44, whose stationary contacts 45 and 46 are respectively connected by circuits 47 and 48 with the positive electrode 38 and negative electrode 39 of the d.c. source 40, serves as a transducer of the current value of the piston 3 position relative to its neutral position. The resistor 44 is rigidly attached to the body 2 of the cylinder 1 by means of a bar 49, while its movable contact 43 serving as the output of the transducer of the current value of the piston 3 position relative to its mid position is attached to the rod 4 of the piston 3 via insulator 50.

The stator 33 of the electromagnet of the converter 30 is attached to the body 2 of the cylinder 1 with the aid of a bracket 51. The armature 31 of the electromagnet of the converter 30 is mounted for pivotal movement relative to the stator 33 about an axle 52. The armature 31 is by means of a tie rod 53, connected with the valve 15.

In the absence of an electric signal in the winding 32 of the armature 31, the latter is maintained in its mid position by springs 54 and 55.

The above-descripted pneumatic or hydraulic steam engine of the invention for use in a transport vehicle operates in the following manner.

The electric oscillator 28 shapes a vibrational control signal for the box valve 15 in the form of sine voltage having a frequency equal to a preset r.p.m. value of the drive shaft 5 set by the lever 29. Said electric signal is supplied via electric circuit 41 to the winding 32 of the electromagnet armature 31 and induces in the latter a magnetic flux which interacts with the magnetic flux induced in the winding 34 and 35 of the stator 33 by the d.c. source 40 via circuits 36 and 37 to make the armature 31 to turn about the axle 52 through a preset angle proportional to the signal of the oscillator 28.

The armature 31, via tie rod 53, moves the valve 15 in a sinusoidal motion along the surface 14 of the body 2 of the cylinder 1.

Upon variation of the electric voltage of the oscillator 28 from zero to the maximum value, the valve 15 will move from its mid position to the right.

This movement will be accompanied by the following: the port 18 opens and the channel 20 comes in communication with the working fluid source via pipeline 22; simultaneously, the port 19 is opened to the interior 24 of valve 15 and the channel 21 comes in communication with the exhaust port 25, whereby the area of the ports 18 and 19 being opened will be varied in accordance with the sine law.

The flow rate of the working fluid supplied via pipeline 32 from the working fluid source 23 to the interior of the valve box 13 and further via port 18 and channel 20 into the rodless cavity 11 will likewise vary according to the sine law, which will result in a sinusoidal character of variation of the force acting upon the piston 3 and, accordingly, in a sinusoidal motion of the piston 3 along the cylinder 1 from the mid position to the maximum value (right-side "dead center") equal to the length of the crank 6.

Upon attenuation of the electric signal of the oscillator 28 from the maximum value down to zero, the valve 15 returns to its mid position and closes the ports 18 and 19 with its walls 16 and 17, the supply of the working fluid to the cylinder 1 will cease and the piston 3 stops in the extreme right-hand position. Upon further variation of the voltage of the oscillator 28 from zero to the minimum value, the valve 15 moves proportionally to the left along the cylinder 1. The valve 15 will simultaneously open the ports 18 and 19. In so doing, the spent working fluid will be removed from the rodless cavity 11 of the cylinder 1 via port 18 and channel 20 to the space 24 of the valve 15 and further via exhaust port 25 to the atmosphere, while fresh working fluid will be supplied via port 19 and channel 21 to the rod cavity 10 of the cylinder 1.

The flow rate of the working fluid supplied via port 19 and channel 21 to the rod cavity 10 of the cylinder 1 will obey the sine law and cause a sinusoidal variation of the force acting upon the piston 3, that will bring about sinusoidal motion of the piston 3 along the cylinder 1 to the left, from the right-hand extreme position to the left-hand one.

Upon variation of the electric signal of the oscillator 28 from the minimum value to zero, the valve 15 once again returns to the mid position and closes the ports 18 and 19 with its walls 16 and 17, the working fluid supply to the cylinder 1 will cease and the piston 3 stops in the extreme left-hand position.

Upon further variation of the electric signal of the oscillator 28 towards higher values, the afore-described phases of movement of the valve 15 and piston 3 will repeat themselves during each variation cycle of the electric signal of the oscillator 28.

Such movement of the valve 15, proportional to the electric signal of the oscillator 28, will result in a sinusoidal nature of the piston 3 movement which is converted by means of the rod 4 and crank 6 to to revolution of the engine drive shaft 5, with the engine r.p.m. value corresponding closely to the vibration frequency of the electric signal of the oscillator 28, said frequency equal to a preset r.p.m. value and set by means of the lever 29.

In order to prevent the engine drive shaft 5 from stopping when the piston 3 is in one of its extreme positions, use is made of the flywheel 9 which accumulates the rotational energy of the drive shaft 5.

An essential condition of stable revolution of the engine drive shaft 5 at any r.p.m. values and loads is the constancy of the amplitude of the piston 3 movement relative to its mid position, said amplitude being equal in value to the length of the crank 6.

Said constancy is ensured with the aid of negative feedback provided by the transducer indicating the current value of the piston 3 position, fashioned as the variable resistor 44 whose movable contact 43 is connected by negative feedback via circuit 42 to one of the ends of the winding 32 of the armature 31 of the converter 30 of electric signal to mechanical movement of the valve 15. The other end of the winding 32 is connected via circuit 41 to the oscillator 28.

Upon rotation of the engine drive shaft 5, the electric signal stripped from the movable contact 43 of the variable resistor 44, whose voltage is proportional to the current value of the piston 3 position relative to its neutral position, is supplied via circuit 42 to the winding 32.

Therefore, the resulting electric signal acting in the winding 32 and, accordingly, the magnetic flux induced by said signal in the armature 31, on whose value depends the angle of turn of the armature 31 about the axle 52 and which controls via valve 15 the amplitude of the piston 3 movement, will present the difference of the electric signals from the oscillator 28 and from the movable contact 43 of the resistor 44.

Owing to this, upon reduction of, say, the amplitude of the piston 3 movement under the effect of load, the resulting electric signal in the winding 32 will increase. The angle of turn of the armature 31 and the amplitude of the valve 15 movement will increase accordingly, which results in an increase of the initially reduced amplitude of the piston 3 movement.

And vice versa, upon reduction of, say, load on the drive shaft 5, the initially increased amplitude of the piston 3 movement will decrease.

Therefore, said negative feedback provides for automatic variation of amplitude in proportion to load, which ensures a stable rotation and single-valuedness of the actual r.p.m. value and the preset value at any r.p.m. values of the engine drive shaft 5, as well as an automatic control over the working fluid flow rate as a function of load, this improving the operating economy.

For amplifying the resulting signal acting in the winding 32 of the armature 31 and presenting the difference of electric signals from the oscillator 28 and movable contact 43 of the resistor 44, in the circuit 41 there is connected a first operational amplifier 56 (see FIG. 2) whose non-inverting input 57 is connected via resistor 58 to the oscillator 28 while its inverting input 59 is connected via resistor 60 to the movable contact 43 of the resistor 44. An output 61 of the operational amplifier 56 is connected to the winding 32 of the armature 31 and, via resistor 62, to its inverting input 59 by a negative electric feedback circuit.

For maneuvering the transport vehicle, when the direction of movement is to be changed to the opposite one, as well as for emergency stopping of the engine in the neutral position of the piston 3, the engine is provided with a three-way switch 63 and a second operational amplifier 64, connected in parallel in the circuit 41.

The three-way switch 63 has one movable contact 65 and three stationary contacts 66, 67, 68. An inverting input 69 of the second operational amplifier 64 is connected via resistor 70 to the oscillator 28 and, via resistor 71, to an output 72 of this latter amplifier.

The movable contact 65 of the three-way switch 63 is connected to the resistor 58 while its stationary contact 67 is connected to the oscillator 28. The stationary contact 68 is connected to the output 72 of the second operational amplifier 64.

Upon closing of the movable contact 65 with the stationary contact 67, the electric signal from the oscillator 28 is supplied via resistor 58 to the non-inverting input 57 of the first operational amplifier 56, as a result of which the engine drive shaft 5 revolves in a preset direction, for example, in the direction shown with arrow A.

The first operational amplifier 56 improves the engine response and extends the range of the limiting r.p.m. values of the drive shaft 5 due to improved dynamic characteristics of the closed control circuit formed by the converter 30 of electric signal of the oscillator 28 to mechanical movement of the valve 15, the valve 15 itself, the piston 3, the movable contact 43 of the variable resistor 44 and the circuit 42.

Figure 2:
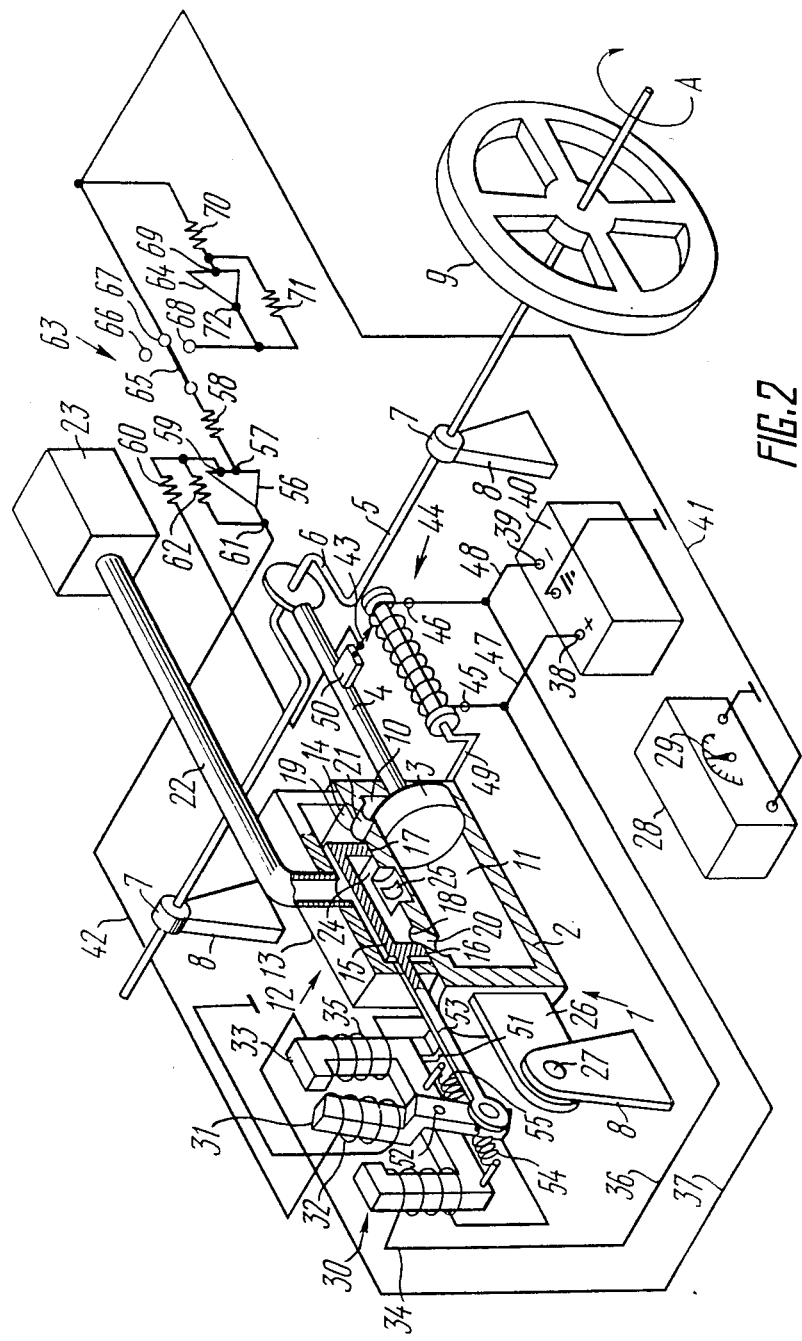
FIG. 2 is a schematic perspective view of the Russin external combustion engine according to the invention, with a switch.

The improvement of the dynamic characteristics of said closed circuit depends on the choice of the amplification factor of the first operational amplifier 56, equal to the ratio of electric resistances of the resistors 62 and 60. While so doing, the maximum possible amplification factor is selected, based on the condition of ensuring the stability of said control circuit. The output signal from the second operational amplifier 64 in the position of the movable contact 65 such as shown in FIG. 2 is not supplied to the input of the first operational amplifier 56.

Upon closing of the movable contact 65 with the stationary contact 66, the electric circuit 41 is broken, i.e., the oscillator 28 is disconnected from the first operational amplifier 56. While so doing, the piston 3 is returned to the neutral position by negative feedback and the drive shaft stops.

Simultaneously, the engine in this position of the movable contact 65 will serve the function of an emergency brake inasmuch as the load acting on the drive shaft 5 affects the piston 3 via crank 6 and rod 4 and causes the piston to shift from its neutral position, and, accordingly, the movable contact 43 of the resistor 44. The latter shapes an electric signal which affects the converter 30 via electric circuit 42 and first operational amplifier 56 to cause movement of the valve 15 which provides, by connecting the cavities 10 or 11 of the cylinder 1 to the working fluid source 23, for the emergence of a counter-acting force applied to the piston 3. This force prevents the engine shaft 5 from turning due to the effect of load. Output signals from the oscillator 28 and a second operational amplifier 64 are not supplied to the input of the first operational amplifier 56.

The higher amplification factor of the operational amplifier 56, the less the value of the piston 3 movement relative to its neutral position and, accordingly, the less the angle through which the engine drive shaft 5 turns.

In case it is necessary to change the direction of the drive shaft rotation to the opposite one (reverse), the movable contact 65 of the switch 63 is closed with the stationary contact 68.

In this position of the movable contact 65, a signal from the oscillator 28 is supplied via resistor 70 to the inverting input of the second operational amplifier 64. The second operational amplifier 64 acts to vary the phase of the electrical signal from the oscillator 28 by 180°. Due to the electric signal phase variation, the direction of the drive shaft rotation changes, say, to a counterclockwise direction of arrow A.

The higher the amplification factor of the first operational amplifier 56, the faster the variation of the direction of the drive shaft rotation, i.e., the higher the engine response.

Figure 3:
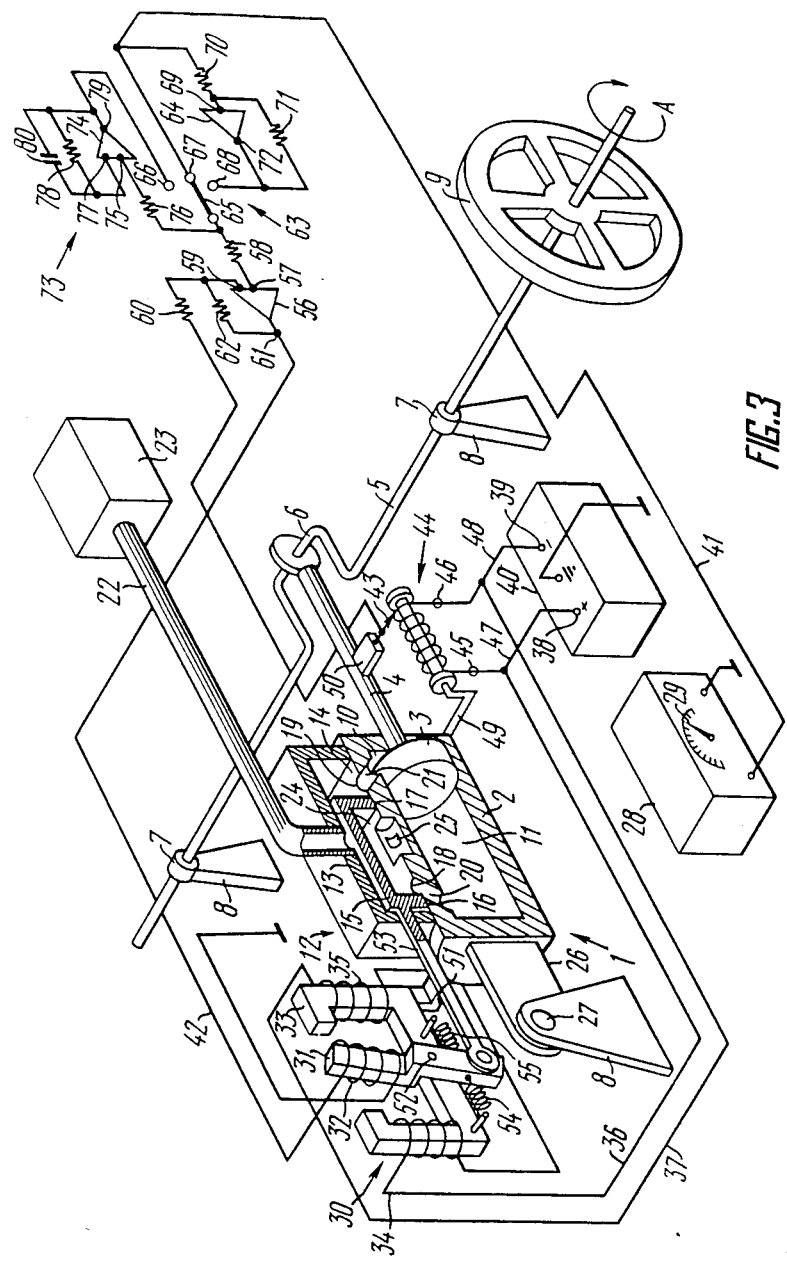
FIG. 3 is a schematic perspective view of the Russin external combustion engine according to the invention, with a device for discontinuing the drive shaft rotation in a preset piston position.

For discontinuing the revolution of the drive shaft 5 in a preset position of the piston 3, the engine according to the the invention is provided with a device 73 (FIG. 3) shaping a constant signal equal to the instantaneous value of the vibrational control signal applied to the non-inverting input 57 of the first operational amplifier 56 at the moment the revolution is discontinued, said device fashioned as, say, an operational amplifier 74. A non-inverting input 75 of the operational amplifier 74 is connected via resistor 76 to the movable contact 65 of the switch 63 while its inverting input 77 is connected via resistor 78 to its output 79 by means of a negative electric feedback circuit. The output 79 of the operational amplifier 74 is connected with the stationary contact 66.

Connected in parallel with the resistor 78 is an electric capacitor 80. With the engine operating in a preset mode, the input of the device 73 is connected in the circuit 41 while its output is disconnected from the noninverting input 57 of the first operational amplifier 56.

Upon closing of the movable contact 65 with the stationary contact 66, the output 79 of the operational amplifier 74 gets connected via movable contact 65 and resistor 76 to its noninverting input 75 by means of a positive feedback circuit and, via resistor 58, to the noninverting input 57 of the first operational amplifier 56.

This causes a practically instantaneous stopping of the piston in the position it occupied at the moment of closing the contact 65 and 66 due to the shaping at the outlet 79 of the operational amplifier 74 of a constant signal equal to the instantaneous value of the vibrational control signal supplied to the amplifier input 75 at the moment the revolution is discontinued.

This is due to the fact that the operational amplifier 74 turns into an integrating dynamic link whose input does not receive signals either from the oscillator 28 or from the operational amplifier 64.

As is known, such a link shapes (stores) at the output a constant signal equal to the instantaneous value of the control signal of the element that was connected by means of the movable contact 65 to the input of said dynamic link, i.e., to the non-inverting input 75 of the operational amplifier 74.

This will cause the piston 3 to stop in a preset position corresponding to the constant signal across the output 79 of the operational amplifier 74.

Starting the engine, as well as reversing it, is done as described hereinabove.

Figure 4:
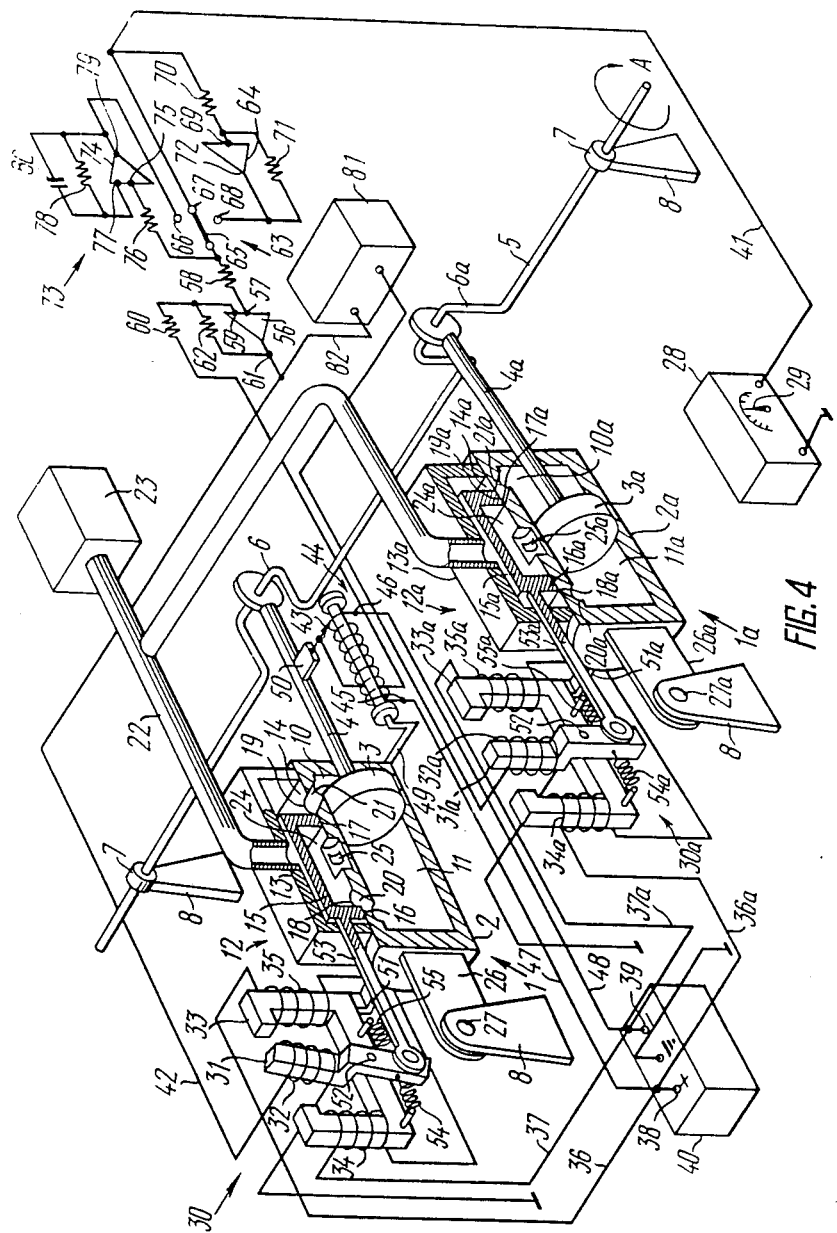
FIG. 4 is a schematic perspective view of the Russin external combustion engine according to the invention, with two actuating cylinders.

In order to ensure a contant torque on the drive shaft 5 over the entire range of r.p.m. values from zero to $\eta_{max}$ at a preset load, as well as a practically absolute uniformity and stability of the drive shaft rotation in the above range of r.p.m. values, the reciprocating steam engine of the invention shown in FIG. 4 is provided with at least one more actuating cylinder 1a set on the drive shaft 5, in whose body 2a a piston 3a is mounted for reciprocation. The initial position of the piston 3a is shifted relative to the position of the piston 3 through a constant value corresponding to the circuit angle of turn, say, 90°, of a second crank 6a with respect to the first crank 6.

The piston 3a has a rod 4a whose one end is rigidly attached to the piston and the other end is articulated with the crank 6a rigidly coupled to the engine drive shaft 5. The piston 3a divides the cavity of the cylinder 1a into two, namely, a rod cavity 10a and a rodless cavity 11a. Mounted on the body 2a of the cylinder 1a is a box-type valve distributor 12a fashioned as a flat box 13a attached to a thoroughly machined surface 14a of the body 2a of the cylinder 1a, referred to as a "slide valve face", on which a valve 15a moves to and fro.

Upon movement of the valve 15a, its walls 16a, 17a open ports 18a, 19a communicating each, via respective channels 20a, 21a, with the cavities 10a and 11a of the cylinder 1a, respectively. The thickness of the walls 16a, 17a is equal to the width of the ports 18a, 19a. The valve box 15a is connected via pipeline 22 with the working fluid source 23 while a space 24a defined by the inner surface of the valve 15a and surface 14a of the body 2a of the cylinder 1a communicates with an exhaust port 25a through which spent working fluid is discharged. The body 2a of the cylinder 1a has an eye 26a in whose hole an axle 27a is located. Said axle 27a serves to connect the cylinder 1a with the engine casing 8.

In the engine, provision is made of a second converter 30a designed to convert an electric signal to mechanical movement of the valve 15a. The converter 30a is fashioned as a linear dynamic link and presents, for example, an electromagnet the movement of whose armature 31a is proportional to the current in its winding 32a.

The electromagnet includes a stator 33a with windings 34a and 35a respectively connected by electric circuits 36a and 37a to the positive electrode 38 and negative electrode 39 of the d.c. source 40.

The stator 33a of the electromagnet of the converter 30a is attached to the body 2a of the cylinder 1a with the aid of a bracket 51a. The armature 31a of the converter 30a is mounted with a possibility of turning relative to the stator 33a about an axle 52a. The armature 31a is mechanically coupled to the valve 15a by means of a tie rod 53a.

The winding 32a of the armature 31a is connected to the output of a unit 81 of constant phase shift between the vibrational control signal supplied from the first operational amplifier 56 and vibrational signal at the output of said unit 81, said shift being equal to the angle of turn of the crank 6a relative to the crank 6, say, 90°. The unit 81 is connected via circuit 82 to the output 61 of the first operational amplifier 56.

The structural embodiment of the constant phase shift unit 81 is described in detail elsewhere (cf., V. L. Shilo, Lineinyie integralnyie skhemy—Linear Integrated Circuits, Sovetskoiye Radio Publishers, Moscow, 1974, p. 170).

During the engine operation, sinusoidal voltage from the oscillator 28 results, first, in a sinusoidal character of movement of the piston 3 and in a sinusoidal variation of the force acting from the side of the piston 3 via rod 4 upon the crank 6 of the drive shaft 5 and, second, in a sinusoidal character of movement of the piston 3a and, accordingly, in a cosinusoidal variation of the force acting from the side of the piston 3a via rod 4a upon the crank 6a of the same shaft 5 owing to the phase shift of the voltage of the oscillator 28 through 90° by means of the constant phase shift unit 81.

The summary torque on the drive shaft 5 is equal to the torque transmitted to the shaft 5 from the first crank 6, proportional to $\sin^2 \psi$, and to the torque transmitted to the shaft 5 from the second crank 6a, proportional to $\cos^2 \psi$. Therefore, the summary torque on the drive shaft 5 will be constant over the entire range of r.p.m. values at a preset load.

In this case, a reduction to zero of the force acting from the side of the piston 3 upon the drive shaft 5 in one of the extreme positions of the latter will be accompanied by the maximum force acting from the side of the piston 3a upon the drive shaft 5. And, on the contrary, a reduction to zero of the force acting upon the drive shaft 5 from the side of the piston 3a in one of the extreme positions of the latter will be accompanied by the maximum force acting from the side of the piston 3. This provides a possibility to fully obviate the need to use the flywheel 9, thereby increasing the engine response considerably.

Such an embodiment of the reciprocating external combustion engine of the invention is due to conditions of its overall composition, despite the fact that the errors of the electric circuit of control over the first actuating cylinder affect the vibrational signal applied to the second actuating cylinder.

Figure 5:
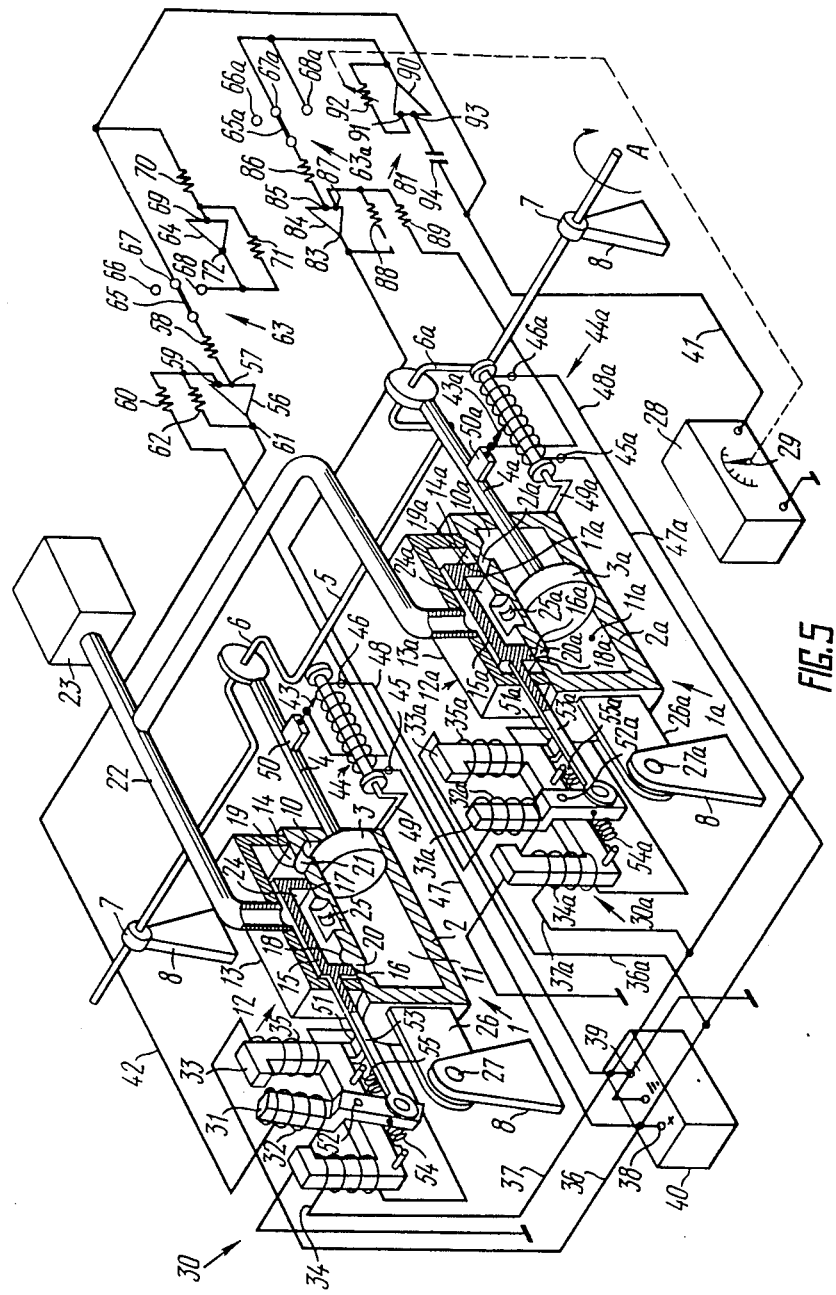
FIG. 5 is a schematic perspective view illustrating another embodiment of the Russin external combustion engine of the invention with two actuating cylinders.

For reducing the effect of the errors of the electric circuit of control over the first cylinder upon the vibrational control signal applied to the second actuating cylinder, disclosure is made of another embodiment shown in FIG. 5 of the herein disclosed reciprocating external combustion engine which is provided with at least one more actuating cylinder 1a set on the drive shaft 5. This latter engine is fully analogous to the aforedescribed engine with two actuating cylinders, with the exception of the electric coupling of the second converter 30a with the oscillator 28. This electric coupling of the second converter 30a with the oscillator 28 is effected as follows. The winding 32a of the armature 31a is connected to an output 83 of a third operational amplifier 84. A non-inverting input 85 of the amplifier 84 is connected via resistor 86 and three-way switch 63 to the output of the constant phase shift unit 81 while its inverting input 87 is connected via resistor 88 to the output 83, via resistor 89 by means of a negative electric feedback circuit—to a transducer of the current value of the position of the second piston 3a relative to its neutral position, namely, to a movable contact 43a of a variable resistor 44a, and via switch 63—to the output of the constant phase shift unit 81.

The resistor 86 is connected to a movable contact 65a of the switch 63 whose stationary contacts 67a and 68a are connected to the output of the constant phase shift unit 81. The movable contact 43a is coupled mechanically with the rod 4a of the second actuating cylinder 1a. Stationary contacts 45a and 46a are connected by respective circuits 47a and 48a with the positive electrode 38 and negative electrode 39 of the d.c. source 40, respectively.

The constant phase shift unit 81 includes, for example, an operational amplifier 90 whose inverting input 91 is connected via variable resistor 92 to its output while its non-inverting input 93 is connected via electric capacitor 94 to the oscillator 28. In so doing, the lever 29 of the oscillator 28 is coupled mechanically with the movable contact of the variable resistor 92.

Such an embodiment of the herein disclosed engine helps fully eliminate the effect of error in the electric circuit of control over the first actuating cylinder 1 upon the vibrational control signal applied to the second actuating cylinder 1a, owing to independent supply of the vibrational control signal to the first 30 and second 30a converters designed to convert an electric signal to mechanical movement of the valves 15 and 15a. This results in a reduced effect of the instrument drift of the operational amplifiers 56, 84 and 90 upon the speed of rotation of the drive shaft 5.

Figure 6:
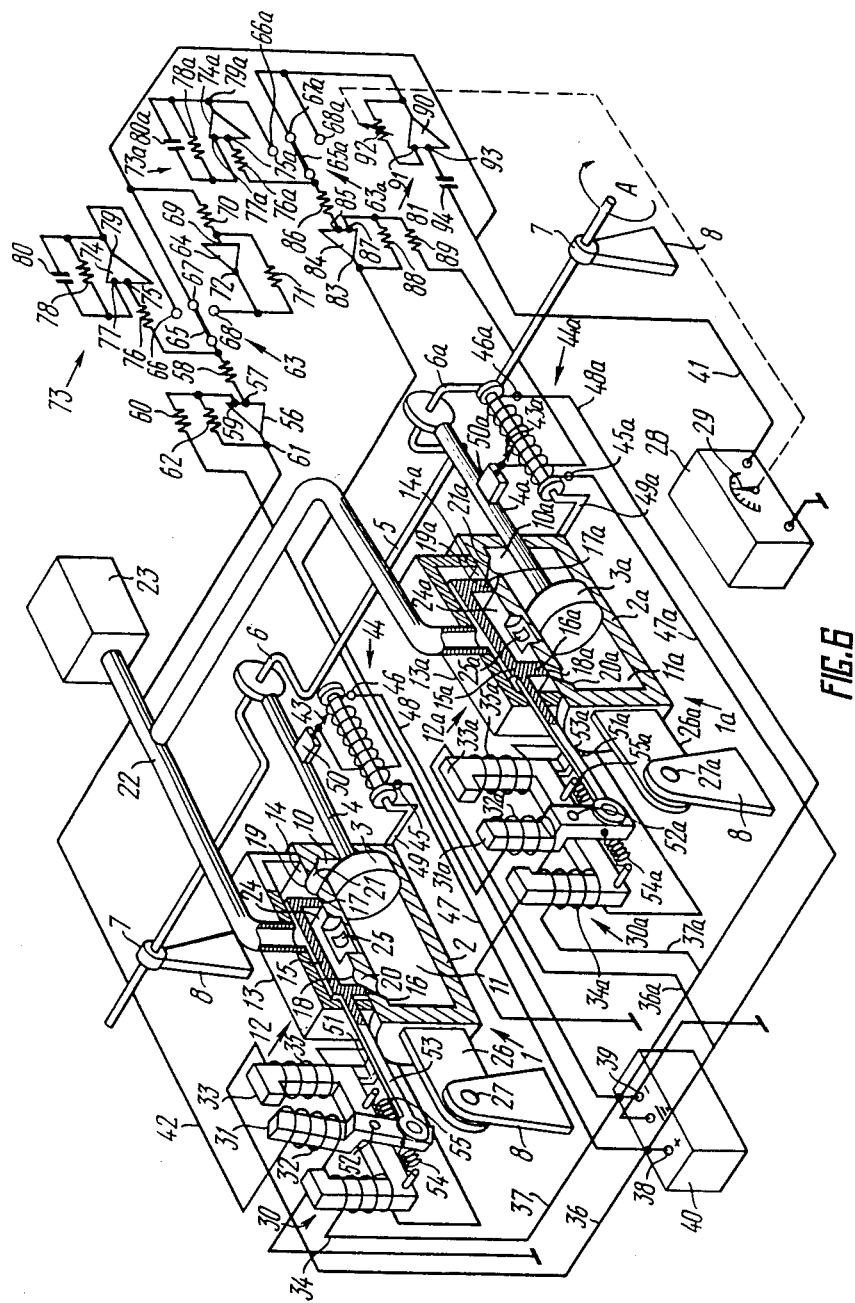
FIG. 6 is a schematic perspective view of the Russin external combustion engine according to the invention, with a second device for discontinuing the drive shaft rotation in a preset position of the piston of the second actuating cylinder.

For discontinuing the revolution of the drive shaft 5 in the embodiment of the herein disclosed reciprocating steam external combustion engine with at least two actuating cylinders 1 and 1a in a preset position of the piston 3a of the second cylinder 1a, provision is made as shown in FIG. 6 of a second device 73a shaping a constant signal equal to the instantaneous value of the vibrational control signal at the moment the revolution is discontinued, said device fashioned as an operational amplifier 74a.

A non-inverting input 75a of said amplifier 74a is connected via resistor 76a to the movable contact 65a of the three-way switch 63 while its inverting input 77a is connected via resistor 78a to an output 79a of said amplifier 74a. An electric capacitor 80a is connected in parallel with the resistor 78a.

The output 79a of the operational amplifier 74a is connected to the stationary contact 66a of the switch 63. The stationary contacts 67a and 68a of said switch 63 are connected to the output of the constant phase shift unit 81.

The engine operation in a preset mode is analogous to that described above, while the stopping of the engine in a preset position of the piston 3a is done analogously with that described in connection with the structural embodiment of the external combustion engine having a single actuating cylinder, with the only exception that the operational amplifier 74a turned into an integrating dynamic link shapes a constant signal equal to the instantaneous value of the control signal from the output of the constant phase shift unit 81.

This causes each one of the pistons 3a and 3 to stop in a preset position, namely, in a position corresponding to the circuit angle of 90° of turn of the second crank 6a relative to the first crank 6 and to signals from the outputs of the devices 73 and 73a, which will cause the drive shaft 5 to stop in a position corresponding to a preset angle $\psi$ of turn.

I claim:
1. Apparatus for controlling the revolution of the drive shaft of an engine comprising:
   an actuating cylinder;
   a piston with rod, serving as an actuating member, mounted for reciprocation inside said actuating cylinder and dividing the cavity of said cylinder into a rodless cavity and a rod cavity;
   a source of working fluid;
   a valve distributor serving as a switching member and communicating each one of said cavities, namely, the rod cavity and the rodless cavity, with said source of working fluid;
   a valve in said valve distributor;
   a crank member serving as a converter of reciprocation of said piston to revolution of a drive shaft and effecting the kinematic coupling of said rod with said drive shaft;
   an electric oscillator whose frequency is variable in accordance with a preset r.p.m. of said drive shaft;
   a converter in the form of a linear dynamic link coupled electrically with said oscillator and mechanically with said valve of said valve distributor;
   a transducer of the current value of the piston position relative to its neutral position, said transducer being coupled by means of negative electric feedback to said converter;
   said negative electric feedback being formed by a first operational amplifier having a non-inverting input connected to said oscillator, an inverting input connected to said transducer, and an output connected to said converter;

a three-way switch for stopping the engine in the neutral position of said piston and for changing the direction of said drive shaft rotation, said switch being connected to a circuit formed by said electric oscillator and said first operational amplifier; and a second operational amplifier, said three-way switch in one of its positions acting to break said circuit formed by said oscillator and said first operational amplifier, in a second position acting to directly connect said oscillator and said amplifier, and in a third position being connected with an output of said second operational amplifier whose inverting input is connected to said electric oscillator.

2. Apparatus as claimed in claim 1, and further comprising: a device for discontinuing the revolution of said drive shaft in a preset position of said piston, said device shaping a constant signal equal to the instantaneous value of said control signal at the moment the revolution is discontinued; and an output of said device being connected via said switch to its input by means of a positive inertia feedback circuit, and to the non-inverting input of said first operational amplifier, the electric circuit formed by said oscillator and said first operational amplifier being broken.

3. Apparatus as claimed in claim 2, further comprising:

a second actuating cylinder;

a second piston with rod, mounted for reciprocation inside said second actuating cylinder and dividing the cavity of said second cylinder into a rodless cavity and a rod cavity;

a second valve distributor serving to communicate each one of said cavities, namely, the rod cavity and the rodless cavity, of said second actuating cylinder with said source of working fluid;

a second valve of said second valve distributor;

a second crank member effecting the kinematic coupling of the second piston rod of said second actuating cylinder with said drive shaft, the initial position of said second piston of said second actuating cylinder being shifted relative to the position of said piston of said first actuating cylinder through a constant value corresponding to the circuit angle of turn of said second crank member with respect to said first crank member;

a constant phase shift unit whose input is connected electrically to said electric oscillator;

a second transducer of the current value of the position of said second piston of said second actuating cylinder relative to its neutral position, said second transducer being coupled mechanically to the second piston rod of said second actuating cylinder;

a third operational amplifier whose non-inverting input is connected via said switch to the output of said constant phase shift unit while its inverting unit is connected by means of negative feedback to said second transducer of the current value of the second piston position of said second actuating cylinder;

a second converter of an electric signal to mechanical movement of said second valve of the second valve distributor, fashioned as a linear dynamic link coupled mechanically with said second valve of said second valve distributor and electrically with the output of said third operational amplifier; and a second device for discontinuing the drive shaft revolution in a preset position of said second piston of said second actuating cylinder, said device shaping a constant signal equal to the instantaneous value of said control signal at the moment the revolution is discontinued, an output of said device being connected via said switch to its input by means of a positive inertia feedback circuit, and to the non-inverting input of said third operational amplifier, the electric circuit formed by said oscillator and said operational amplifier being broken.

4. Apparatus as claimed in claim 1, further comprising:

a second actuating cylinder;

a second piston with second rod, mounted for reciprocation inside said second actuating cylinder and dividing the cavity of said second cylinder into a rodless cavity and a rod cavity;

a second valve distributor serving to communicate each one of said cavities, namely, the rod cavity and the rodless cavity, of said second actuating cylinder with said source of working fluid;

a second valve in said second valve distributor;

a second crank member effecting the kinematic coupling of the second piston rod of said second actuating cylinder with said drive shaft, the initial position of said second piston of said second actuating cylinder being shifted relative to the position of said piston of said first actuating cylinder through a constant value corresponding to the circuit angle of turn of said second crank member with respect to said first crank member;

a constant phase shift unit whose input is connected electrically to said electric oscillator;

a second transducer of the current value of the position of said second piston of said second actuating cylinder relative to its neutral position, said second transducer being coupled mechanically to the second piston rod of said second actuating cylinder;

a third operational amplifier whose non-inverting input is connected via said switch to the output of said constant phase shift unit while its inverting input is connected by means of negative electric feedback to said second transducer of the current value of the second piston position of said second actuating cylinder; and a second converter to an electric signal to mechanical movement of said second valve of the second valve distributor, fashioned as a linear dynamic link coupled mechanically with said second valve of said second valve distributor and electrically with the output of said third operational amplifier.

* * * * *